Sept. 2, 1941. A. G. HORVATH Re. 21,893

JET PUMP

Original Filed Dec. 22, 1937 3 Sheets-Sheet 1

Inventor
ANTHONY G. HORVATH
By Toulmin & Toulmin
Attorneys

Sept. 2, 1941. A. G. HORVATH Re. 21,893
JET PUMP
Original Filed Dec. 22, 1937 3 Sheets-Sheet 2
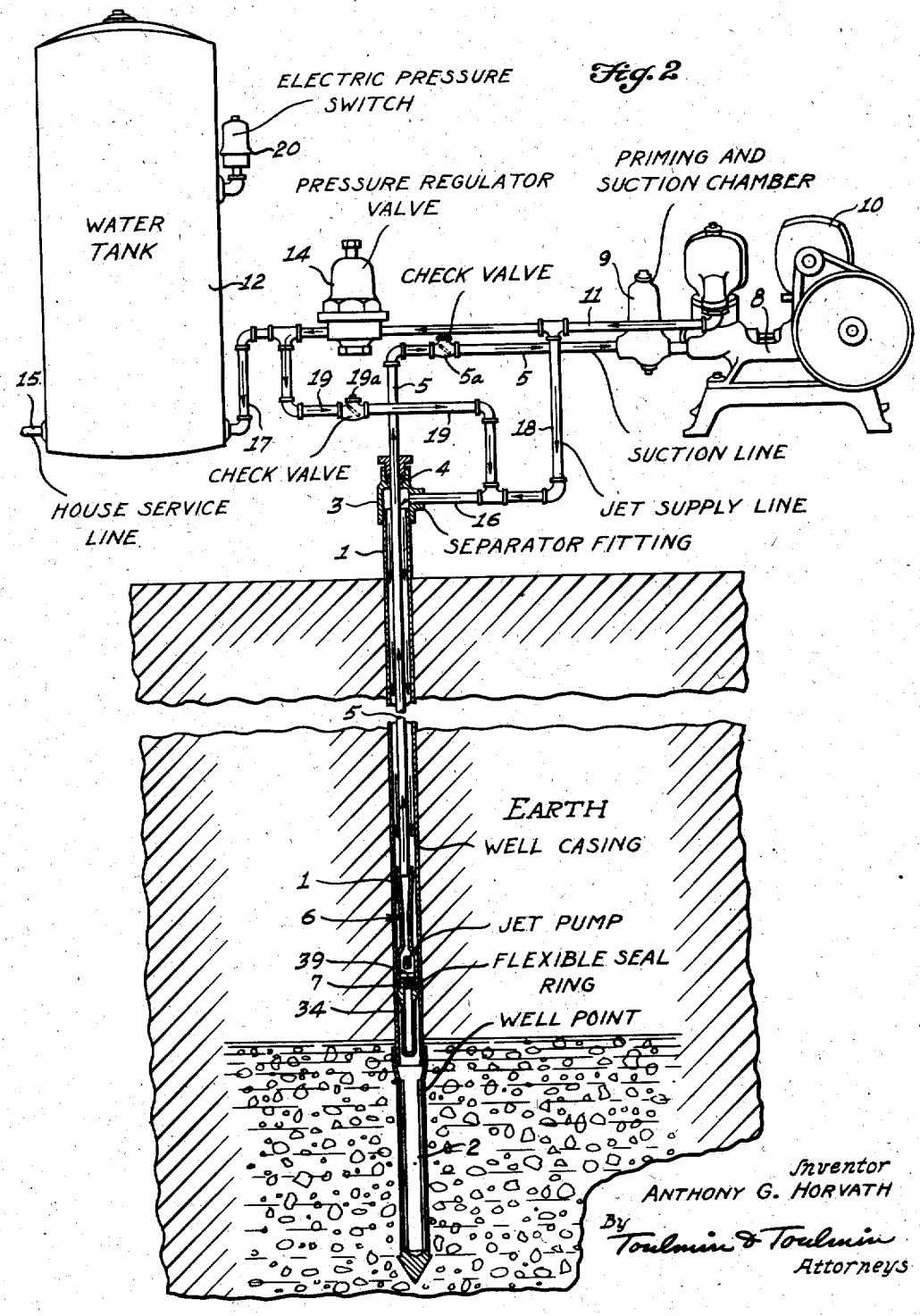
Inventor
ANTHONY G. HORVATH
By Toulmin & Toulmin
Attorneys Sept. 2, 1941. A. G. HORVATH Re. 21,893
JET PUMP
Original Filed Dec. 22, 1937 3 Sheets-Sheet 3
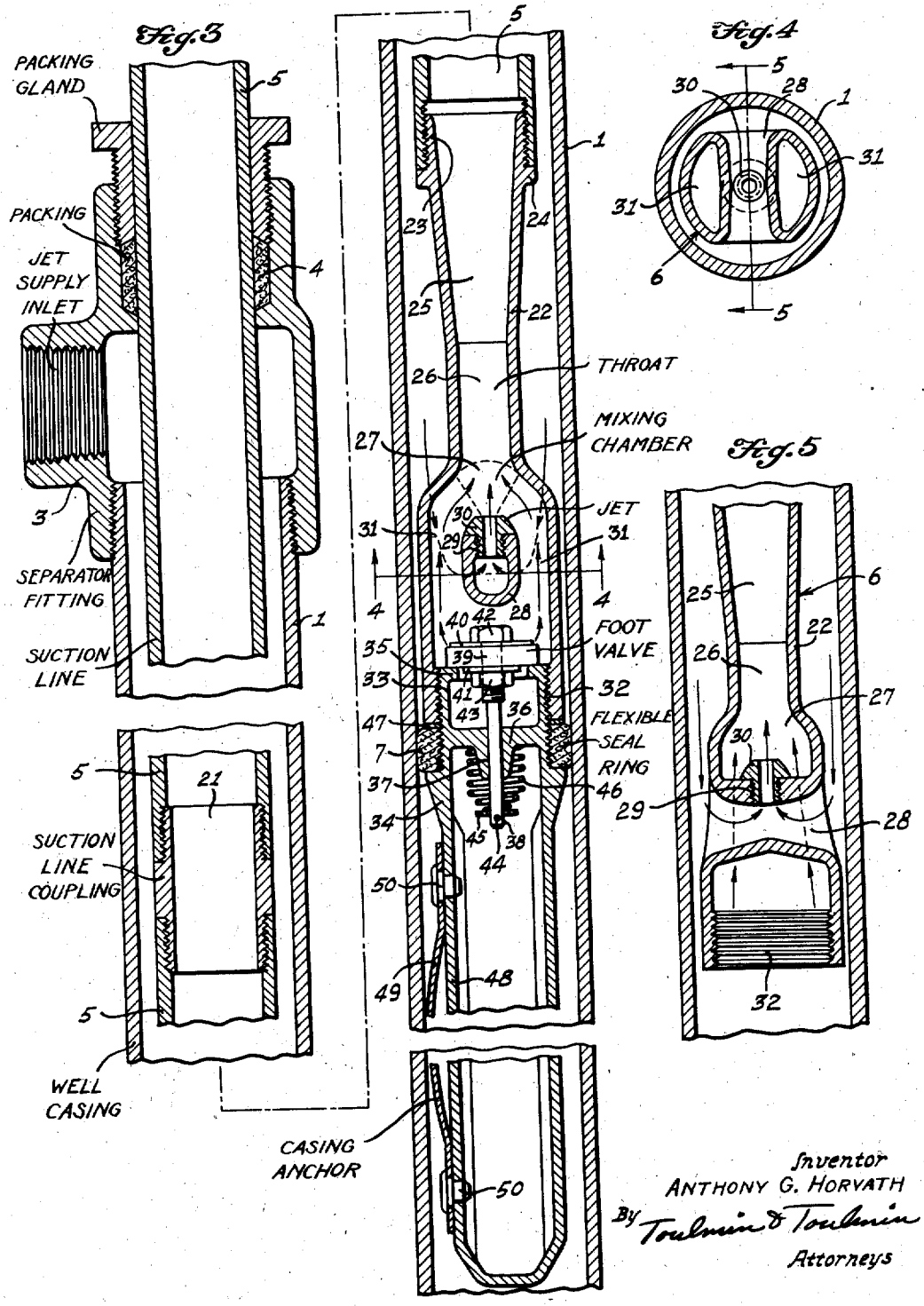
Inventor
ANTHONY G. HORVATH
By Toulmin & Toulmin
Attorneys Reissued Sept. 2, 1941

Re. 21,893

UNITED STATES PATENT OFFICE 21,893

JET PUMP

Anthony G. Horvath, Dayton, Ohio, assignor to The Dayton Pump and Manufacturing Company, Dayton, Ohio, a corporation of Ohio Original No. 2,196,453, dated April 9, 1940, Serial No. 181,188, December 22, 1937. Application for reissue July 15, 1940, Serial No. 345,678

8 Claims. (Cl. 103—5)

This invention relates to pumps and in particular to deep well jet pumps.

It is an object of this invention to provide a deep well jet pump system which is simple, economical and efficient.

It is a further object of this invention to provide, in such a system, structure particularly adapted for use with well casings of small diameter, such as shallow well pump casings whereby such casings may be utilized and driven to sufficiently deep ground levels to form a deep well.

It is a further object of this invention to provide, in such a system, a jet pump structure particularly adapted for disposition in a well casing in such manner as to utilize the well casing itself for supplying water for operating the jet pump of the system.

It is a further object of this invention to provide, in such a system, a single pipe jet pump structure particularly adapted for disposition in, or insertion in, a well casing for cooperation therewith to provide a jet pump operative, in connection with a pressure tank pump system or the like, to lift water from deep wells.

It is a further object of this invention to provide a deep well pump system wherein the necessity for the provision, adjacent the well head, of pits or emplacements for the pumping structure is totally obviated and wherein the pump, tank and other operative structure may be located at a substantial distance from the well without impairment of the efficiency of the system.

It is a further object of this invention to provide a deep well pump system wherein casings of small diameter, such as those customarily used in shallow wells, may be driven to form a deep well of a desired depth whereby to obviate the necessity for expensive well boring.

These and other objects and advantages will appear from the following description taken in connection with the drawings.

In the drawings:

Figure 2 is a similar view of an installation found preferable for deep wells of average depth;

Figure 3 is a section of a jet pump according to the principles of this invention with the well casing and suction line broken away;

Figure 4 is a section taken on the line 4—4 of Figure 3; and

Figure 5 is a section taken on the line 5—5 of Figure 4.

Figure 1:
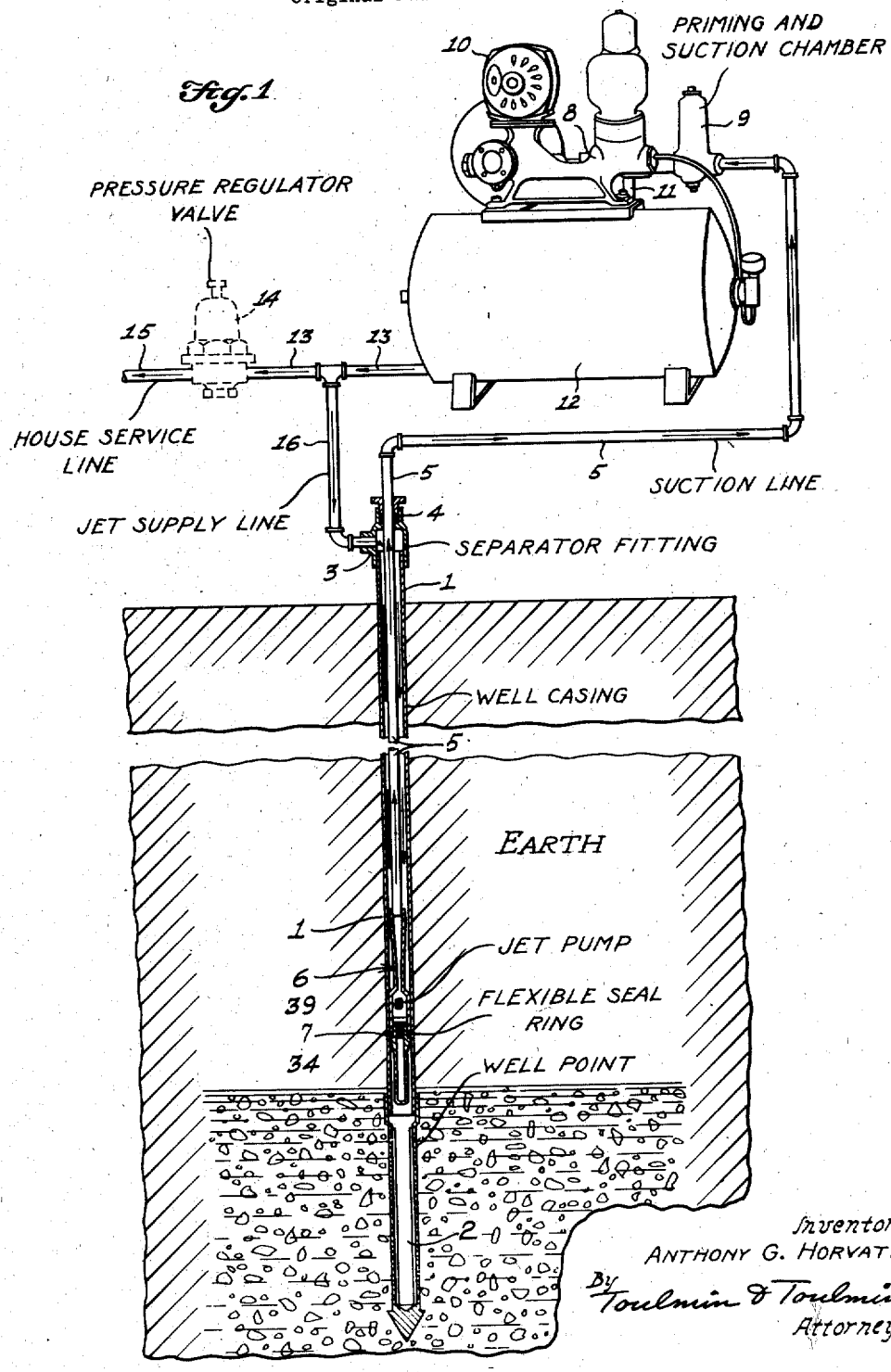
Figure 1 is a diagrammatic view of a preferred water system installation for deep wells of moderate depth.

According to the principles of this invention, the only moving part below the ground level is the foot valve of the jet pump. The pump, tank, and other parts of the system may be substantially spaced from the well without impairment of the efficiency of the system and may be, therefore, housed at any suitable location with the utmost of convenience in operation, service and inspection regardless of the location of the well. Also, due to the compactness of the jet pump structure, it may be inserted in a well casing of relatively small diameter and provided with a single suction line connection to the inlet of the pump whereby the well casing cooperates with the concentrically and interiorly arranged suction line to form a conduit for supplying water downwardly between the well casing and the suction line for operating the jet pump.

Referring to the drawings in detail and with reference particularly to Figure 1, wherein is illustrated the application of the principles of this invention to a deep well of moderate depth as, for instance, from twenty to fifty feet, the well casing which is designated 1 has the perforated well point 2 screw-threadedly or otherwise suitably rigidly attached thereto and they may be generally located in operative position by driving, and without necessity for boring.

Rigidly secured at the upper end of the well casing 1 is the fitting 3 having a packing gland with packing 4, through which extends downwardly the suction line 5 which has the jet pump generally designated 6 rigidly secured to its lower end and provided with a flexible sealing ring 7 of rubber, synthetic rubber, or any other suitable material which engages and cooperates with the inner wall of the well casing 1 to form a waterproof seal.

The suction line, as illustrated in Figure 1, is connected to the priming and suction chamber 9 of the pump 8 which is suitably driven by the motor 10, and which pump 8 is connected by means of the delivery pipe 11 with the tank 12 which provides a support for the pump. The tank outlet 13 is connected to the pressure regulator valve 14 which is also connected to the house service line 15. If desired, the pressure regulator valve 14 may be omitted and the tank outlet 13 may be connected directly to the house service line 15. The jet supply line 16 is connected to the tank outlet 13 and also to the separator fitting 3. The packing 4 provides air and watertight connection between the well casing 1 and suction line 5 at the upper end, while the flexible sealing ring 7 provides like connection between the jet pump 6 and the lower end of the well casing 1. This forms between the suction line 5 and its connected jet pump 6 and the well casing 1 an annular air and watertight supply conduit for receiving water from the tank 12 to the jet supply line 16, which water is forced downwardly by pressure in the direction of the arrows in Figure 1 and passes into the mixing chamber of the jet pump through the jet to aid the suction of the pump 8 in lifting water from the interior of the well point 2 through the foot valve in the jet pump 6. The pressure regulator valve 14 makes possible the control of the pressure in the house service line 15 within narrow limits and it is, of course, to be understood that the pressure in the tank outlet 13 and the jet supply line 16 is substantially greater than the pressure in the house service line 15.

With this arrangement, the pump 8 builds up fluid pressure in the tank 12, which is transmitted through the jet supply line 16 to the conduit formed between the suction line 5 and the well casing 1, and this fluid pressure, in passing through the jet in the jet pump, acts upwardly in addition to the suction applied directly by the pump 8 to the suction line 5 to lift water from the interior of the well point 2 and through the priming and suction chamber 9 of the pump to the pump and thence through the delivery pipe 11 of the pipe to the tank 12.

For deep wells of average depth, as for depths exceeding 50 feet, it is preferred that the arrangement illustrated in Figure 2 be utilized. The arrangement of the well casing 1, well point 2, separator fitting 3, suction line 5 and jet pump 6 is the same as that illustrated in Figure 1. As shown in Figure 2, the suction line 5 is provided with a check valve 5a which enables fluid to pass upwardly in the suction line 5 to the priming and suction chamber 9 of the pump 8, while preventing flow in the opposite direction in the suction line 5.

The delivery line 11 of the pump is connected directly to the pressure regulator valve 14 which has connection through the tank supply line 17 with the tank 12, and the tank 12 is directly connected to the house service line 15. The jet supply line 16 is connected by the line 18 with the pump delivery 11 and also by means of the line 19 with the tank supply line 17. The line 19 is provided with a check valve 19a by means of which, fluid may flow to the jet supply line 16 from the line 17 and whereby return flow is prevented. The operation of the motor 10 to drive the pump 8 is controlled by the electric pressure switch 20, which is mounted on the water tank 12 and which is provided with suitable electric connection (not shown) with the operating circuit of the motor 10 for controlling the motor 10.

In the arrangement illustrated in Figure 2, pressure differential between the pump delivery 11 and the tank supply line 17 is controlled by the valve 14, and fluid is normally supplied from pump delivery 11 through line 18 and jet supply line 16 to the space between the exterior of the suction line 5 and the interior of the well casing 1 and thence through the jet pump 6, where it aids the suction applied by the pump upon the suction line 5 in lifting water from the interior of the well point 2. The check valve 19a prevents flow of fluid from the jet supply line 16 to the tank supply line 17, but whenever the pressure in the tank supply line 17 and tank 12 is greater than that in the jet supply line 16, the check valve 19a permits fluid to flow from the tank supply line 17 through the line 19 to the jet supply line 16, where it is additive to the fluid pressure supplied through line 18 to the jet supply line 16.

The details of the jet pump illustrated in Figures 1 and 2 are shown in Figures 3, 4 and 5. As shown in those figures, the suction line 5 is formed of a plurality of lengths or sections of piping, also designated 5, which are internally screw-threaded at their ends and secured together by means of suction line coupling members 21. To the lower screw-threaded end of the lowermost section 5 of the suction line is screw-threadedly attached the exteriorly screw-threaded upper end 23 of the casting 22, which forms the main body of the jet pump. This casting 22 is provided adjacent and below the screw-threaded end portion 23 with an annular thrust shoulder 24 which is adapted for abutment with the extreme end of the lowermost section 5 and the upper end of the casting 22 is provided with a frusto-conical downwardly reduced interior portion 25 which leads to the throat 26 of the jet pump. Immediately below the throat 26 is the mixing chamber 27.

An anunlar transverse wall 28 extends from side to side of the lower portion of the casting 22 and joins the sides of the casing, and in the upper portion of this wall is a screw-threaded aperture 29 in which is screw-threadedly secured the jet 30 which provides communication between the mixing chamber 27 and the transverse channel formed by the annular wall 28, which transverse channel communicates with the space between the exterior of the walls of the casting 22 and the interior of the wall of the well casing 1. The annular wall 28 separates the surrounding portion of the casting 22 into two conduits 31 (Fig. 4) for supplying water upwardly to the mixing chamber 27. The extreme lower end of the casting 22 is screw-threaded at 32 and receives the upper screw-threaded portion 33 of the casing anchor member 34 which has the foot valve seat 35 formed at its upper end and the valve stem guide 36 formed therein below and in spaced relation to the seat 35 and provided with a central bore or aperture 37 for receiving the stem 38 of the foot valve which has the disk 39 thereof formed of any suitable material and interposed between an upper washer member 40 and a lower washer member 41 which are clampingly engaged therewith by means of the head 42 of the stem 38 and the nut 43 which is disposed on the screw-threaded upper portion of the stem 38.

At its lower end, the stem 38 is provided with a suitable transverse pin 44 which supports the thrust washer 45. The spring 46 has at its upper end in engagement with the wall 36 and its lower end in engagement with the washer 45 in such manner as normally to retain the foot valve disk 39 on the seat 35 to prevent flow of fluid downwardly through the foot valve. Below the wall 36, the casing anchor member 34 is provided with an outwardly directed annular flange for engaging the lower end of the flexible sealing ring 7 which has its upper end engaged by a washer 47 which is in abutment with the extreme lower end of the casting 22.

Below the above described annular flange, the casing anchor member 34 is provided with a loop-shaped extension 48, to one side of which the casing anchor spring 49 is secured at either end by means of a suitable rivet 50. The casing anchor spring 49 is in the form of a flat spring member suitably bowed for cooperation with the member 48 at the interior wall of the well casing 1 to prevent relative rotation therebetween.

The direction of flow of fluid is shown in Figures 3 and 5 and it will be seen that fluid under pressure flows downwardly between the interior wall of the well casing 1 and the exterior wall of the casting 22 through the annular wall 28 and thence upwardly through jet 30 to the mixing chamber 27 (full lines, Fig. 5). This upwardly directed water spreads outwardly from the jet 30 to form a spray indicated by dotted lines in Figure 3, and this causes a partial vacuum or reduces the pressure above the disk 39 of the foot valve so as to cause the foot valve to move upwardly, whereby water flows upwardly through the foot valve port into the mixing chamber, and, with the water which has passed thereinto from the jet 30, it passes upwardly through the throat 26 and the frusto-conical portion 25 and thence upwardly through the suction line 5 under suction applied to the suction line 5 by the pump 8. The upward force of the water passing through jet 30 is, of course, additive to the upward force of suction applied through the suction line 5 by the pump 8.

When the pump is operating and suction is applied through the suction line 5, the foot valve disk 39 is raised from its seat whereby to permit upward flow of water from the well point 2 into the mixing chamber of the jet pump 6. However, as soon as the pump 8 ceases to exert suction through the suction line 5, the foot valve disk 39 is seated to prevent downward flow of water through the foot valve port and thus to prevent loss of prime in the pump system.

While the pump illustrated is of the motor driven reciprocatory type, it is, of course, to be understood that various other known forms of pumps may be applied in the same manner and for the same purpose. Furthermore, while the pump 8, in both of the arrangements illustrated in Figures 1 and 2, has been shown as closely disposed with respect to the head of the well or the upper end of the well casing 1, they may be quite remotely disposed with respect thereto without in any wise appreciably affecting the efficiency of the system.

The extreme compactness of the jet pump 6, and its arrangement with the suction line 5 concentrically of the well casing 1, permits the use of well casings of such small diameter as have hitherto been used entirely in shallow driven wells. The ability to use such small well casings makes it possible to drive wells of such depth as hitherto necessitated expensive and laborious well boring operations. While it was hitherto possible to drive such casings to such depth as to secure deep wells, it was impossible to lift water from such depth by any known apparatus which could be disposed within casings of such small diameters as, for instance, the most common size of shallow well casing of 1¼" diameter. The ability to use casings of such small diameter appreciably reduces the cost of deep wells due to the reduction of cost required for the provision of suitable well casings.

In deep well systems constructed according to the principles of this invention, the only part below the ground level which might be considered a moving part is the foot valve, although this part may not, in the strictest sense of the word, be called a moving part, because it merely opens when the operation of the pump 8 begins, and closes to prevent down flow of water therethrough when the suction in the suction line 5 is sufficiently reduced to permit such down flow of water through the foot valve of the jet pump 6. One of the important features of the invention is the use of the well casing 1, in cooperation with the suction line 5, concentrically arranged therein, to form a conduit for supplying water downwardly for operation of the jet pump.

Another feature of the invention is the provision of structure which is sufficiently compact to make possible the use, in deep wells, of well casing of such small diameter as will permit them to be driven into the ground to sufficient depth without the necessity for boring which is a necessary and expensive procedure where well casings of greater diameter must be provided. In its broader aspect, this invention consists in the provision of a method and apparatus for the production of deep well operation by the use of shallow well pump structure.

It is, of course, to be understood that the above-described structure is merely illustrative of the manner in which the principles of my invention may be utilized and that I desire to comprehend within my invention such modifications as come within the scope of the claims and the invention.

Having thus fully described my invention, what I claim as new and desire to secure by Letters Patent is:

1. In a deep well pump system, a pump, a pump delivery line connected to the delivery of said pump, a pressure regulator valve connected to said delivery line, a tank supply line connected to said pressure regulator valve, a water tank connected to said tank supply line and to a house service line, jet pump means including a suction line and jet pump supply conduit means, means including a check valve connecting said suction line with the suction of said pump, means directly connecting said jet pump supply conduit means with said pump delivery line, and means including a check valve connecting said tank supply line with said jet pump supply conduit means.

2. In a deep well pump system, a motor driven pump having a suction and a delivery, a pump delivery line connected to the delivery of said pump, a pressure regulator valve connected to said pump delivery line, a tank supply line connected to said pressure regulator valve, a water tank connected to said tank supply line and to a house service line, pressure responsive pump motor control switch means on said tank, jet pump means including a suction line and surrounding jet pump supply conduit means, means including a check valve connecting said suction line directly with the suction of said pump, means directly connecting said jet pump supply conduit means with said pump delivery line, and means including a check valve connecting said tank supply line with said jet pump supply conduit means.

3. In a deep well system, a well casing, a jet pump in said well casing, a suction line in said well casing connected to said jet pump, sealing means forming a jet pump supply conduit between said well casing and said jet pump and suction line, and means for applying suction to said suction line and fluid pressure to said jet pump supply conduit comprising a fluid pressure pump, means including a check valve connecting the suction of said pump to said suction line, a pump delivery line connected to the delivery of said pump, a pressure regulator valve connected to said pump delivery line, a water tank connected to a house service line, a connection between said tank and said pressure regulator valve, means including a check valve connecting said last-named connection with said jet pump supply conduit, and means directly connecting said pump delivery line with said jet pump supply conduit.

4. In a deep well system, a well casing, a jet pump in said well casing, a suction line in said well casing connected to said jet pump, sealing means forming a jet pump supply conduit between said well casing and said jet pump and suction line, and means for applying suction to said suction line and fluid pressure to said jet pump supply conduit comprising a motor driven pump, means including a check valve connecting the suction of said pump to said suction line, a pump delivery line connected to the delivery of said pump, a pressure regulator valve connected to said pump delivery line, a water tank connected to a house service line, a pressure responsive pump motor control switch connected to said water tank, a connection between said tank and said pressure regulator valve, means including a check valve connecting said last-named connection with said jet supply conduit, and means directly connecting said pump delivery line with said jet pump supply conduit.

5. In a deep well pump system, a liquid pressure pump having a suction conduit and a delivery conduit, a tank connected to the delivery conduit of said pump, pressure regulator valve interposed in said delivery conduit between said pump and said tank, a service delivery line connected to said tank, a well casing, a suction pipe in said well casing, a sealing member between said well casing and said suction pipe dividing said well casing into upper and lower chambers, a jet pump in said suction pipe communicating with said upper well casing chamber and discharging into said suction pipe, said suction pipe being connected to the suction conduit of said fluid pressure pump above said jet pump and to said lower well casing chamber below said jet pump, a foot valve between said suction pipe and said lower well casing chamber, and means connecting said fluid pressure pump delivery conduit on the exit side of said pressure regulator valve with said upper well casing chamber.

6. In a deep well pump system, a well casing, a suction pipe in said well casing, sealing means between said well casing and said suction pipe dividing said well casing into upper and lower well casing chambers, a jet pump within said suction pipe connected to said upper well casing chamber, a fluid pressure pump having a suction conduit and a delivery conduit, means connecting said suction pipe with said pump suction conduit, a tank connected to said pump delivery conduit, a pressure regulator valve interposed in said pump delivery conduit between said pump and said tank, a service delivery line connected to said tank, and a pair of jet pump supply lines connecting said upper well casing conduit with said pump delivery conduit on opposite sides of said pressure regulator valve.

7. In a deep well pump system, a fluid pressure pump having a suction and a delivery line, a service line connected to the delivery side of said pump, fluid flow regulator means connected to said delivery line and communicating with said service line, a well casing sealed at the top forming an upper chamber, a jet pump located near the bottom of said casing, a suction line in said well casing connected to said jet pump and the suction side of said fluid pressure pump, means comprising a conduit and including said upper chamber connected with said delivery line on either side of said fluid regulator means and the inlet side of said jet pump for supplying fluid under pressure to operate said jet pump, means comprising a perforated well point communicating with said well casing, means for sealing the lower part of said well casing below said jet pump so as to divide the well casing into an upper and lower chamber, and a foot valve below said jet pump for controlling the flow of fluid from the lower chamber of said well casing into the upper chamber and to said jet pump.

8. In a deep well pump system, a fluid pressure pump having a suction and delivery line connected therewith, a service line communicating with the delivery side of said pump, fluid flow regulator means connected to said delivery line and communicating with said service line, a well casing in which is disposed near the bottom a jet pump means, a suction line in said casing and connected to said jet pump and the suction side of said fluid pressure pump, means comprising a conduit and including the upper chamber of said casing connected with said delivery line on either side of said flow regulator means and the inlet side of said jet pump, whereby fluid under pressure to operate said jet pump may be supplied from the service line or directly from the fluid pressure pump delivery line, said casing forming a liquid passageway for the operation of said jet pump, means comprising a perforated well point communicating with the bottom portion of said well casing, and means for sealing the lower part of said well casing below said jet pump so as to divide the well casing into an upper and lower chamber.

ANTHONY G. HORVATH.